(12) United States Patent
Panther et al.

(10) Patent No.: US 11,594,819 B2
(45) Date of Patent: *Feb. 28, 2023

(54) ANTI-JAMMING AND REDUCED INTERFERENCE GLOBAL POSITIONING SYSTEM RECEIVER METHODS AND DEVICES

(71) Applicant: TALLYSMAN WIRELESS INC.

(72) Inventors: Gyles Panther, Ottawa (CA); Julien Hautcoeur, Gatineau (CA)

(73) Assignee: Tallysman Wireless Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,728

(22) Filed: May 24, 2022

(65) Prior Publication Data

US 2022/0285845 A1 Sep. 8, 2022

Related U.S. Application Data

(63) Continuation of application No. 16/369,711, filed on Mar. 29, 2019, now Pat. No. 11,411,316.

(60) Provisional application No. 62/650,535, filed on Mar. 30, 2018.

(51) Int. Cl.
*H01Q 9/04* (2006.01)
*H01Q 19/00* (2006.01)
*G01S 19/21* (2010.01)

(52) U.S. Cl.
CPC ......... *H01Q 9/0414* (2013.01); *H01Q 9/0407* (2013.01); *H01Q 19/005* (2013.01); *G01S 19/21* (2013.01)

(58) Field of Classification Search
None
See application file for complete search history.

(56) References Cited

U.S. PATENT DOCUMENTS

| 4,316,194 A | 2/1982 | De Santis et al. |
| 4,329,689 A * | 5/1982 | Yee .................. H01Q 5/385 |
| | | 343/700 MS |

(Continued)

FOREIGN PATENT DOCUMENTS

JP  WO2003041222 A1  5/2003

*Primary Examiner* — Gregory C. Issing
(74) *Attorney, Agent, or Firm* — Rosenberg, Klein & Lee

(57) ABSTRACT

Global navigation satellite system (GNSS) radio frequency signals broadcast from geo-stationary satellites 20,000 km above the earth when received by GNSS receivers are fundamentally weak. Accordingly, these GNSS receivers are vulnerable to accidental and deliberate interference from a range of synthetic sources as well as natural sources. Existing anti jamming technologies such as controlled reception pattern antennas, adaptive antennas, null-steering antennas, and beamforming antennas etc. are expensive and incompatible with many lower cost and footprint limited applications. However, in many applications the GNSS antenna is mounted upon a fixed or mobile element such that accidental and intentional jammers tend to be in the plane of the antenna or below it. Accordingly, there are presented designs and techniques to improve the anti-jamming or interference performance of GNSS receivers by further reducing the responsivity of the GNSS receiver to signals in-plane or below the plane of the antenna.

20 Claims, 13 Drawing Sheets

(56) References Cited

U.S. PATENT DOCUMENTS

| | | | |
|---|---|---|---|
| 4,835,538 A * | 5/1989 | McKenna | H01Q 9/0414 |
| | | | 343/700 MS |
| 5,497,164 A | 3/1996 | Croq | |
| 7,132,989 B1 | 11/2006 | Poilasne | |
| 7,202,818 B2 | 4/2007 | Pros et al. | |
| 7,307,587 B2 * | 12/2007 | Eom | H01Q 1/22 |
| | | | 343/848 |
| 7,812,767 B2 | 10/2010 | Seki et al. | |
| 2008/0036665 A1 | 2/2008 | Schadler | |
| 2016/0020521 A1 | 1/2016 | Astakhov et al. | |
| 2018/0166773 A1 | 6/2018 | Tatarnikov et al. | |

\* cited by examiner

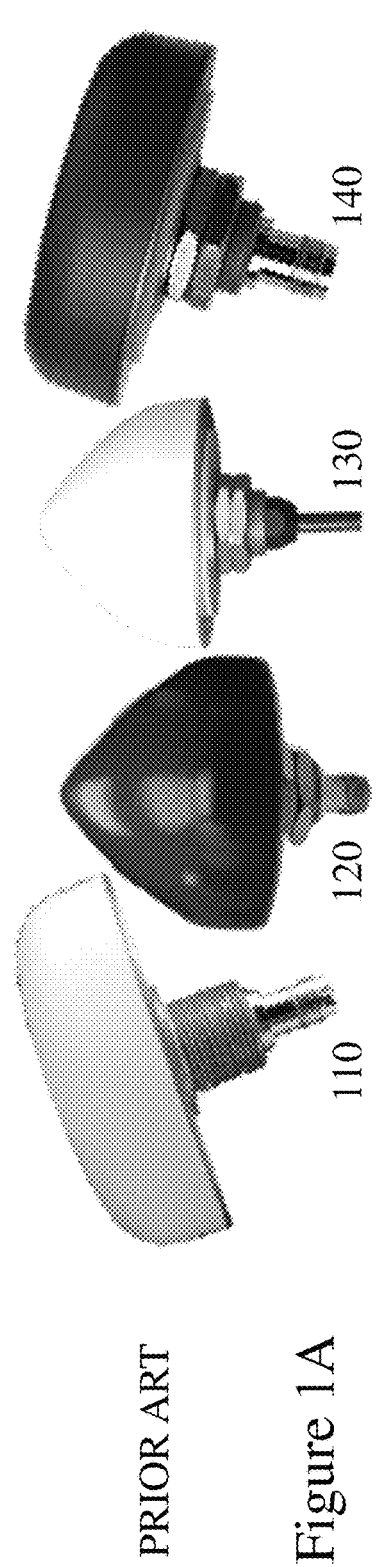
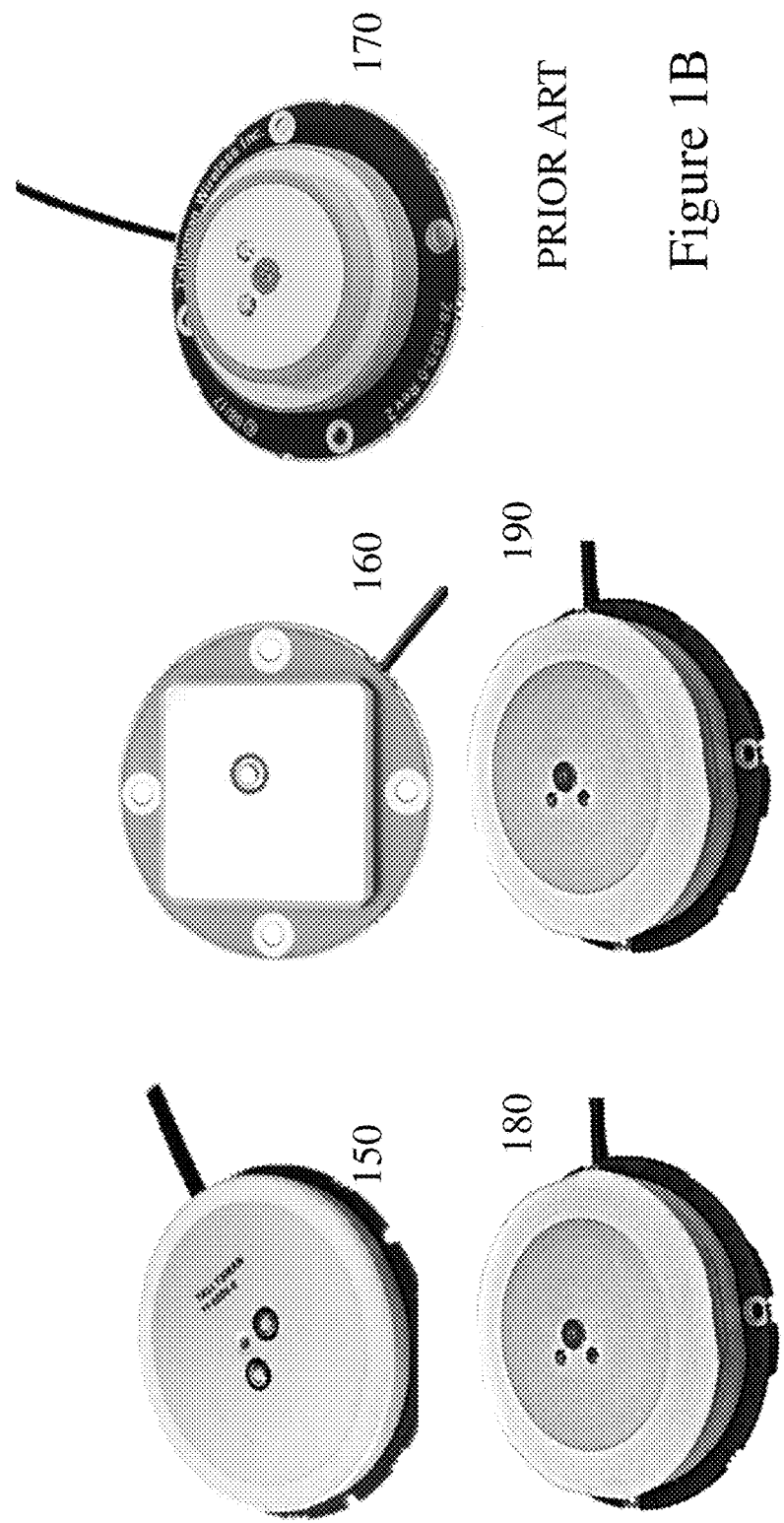
PRIOR ART
Figure 1A
PRIOR ART
Figure 1B

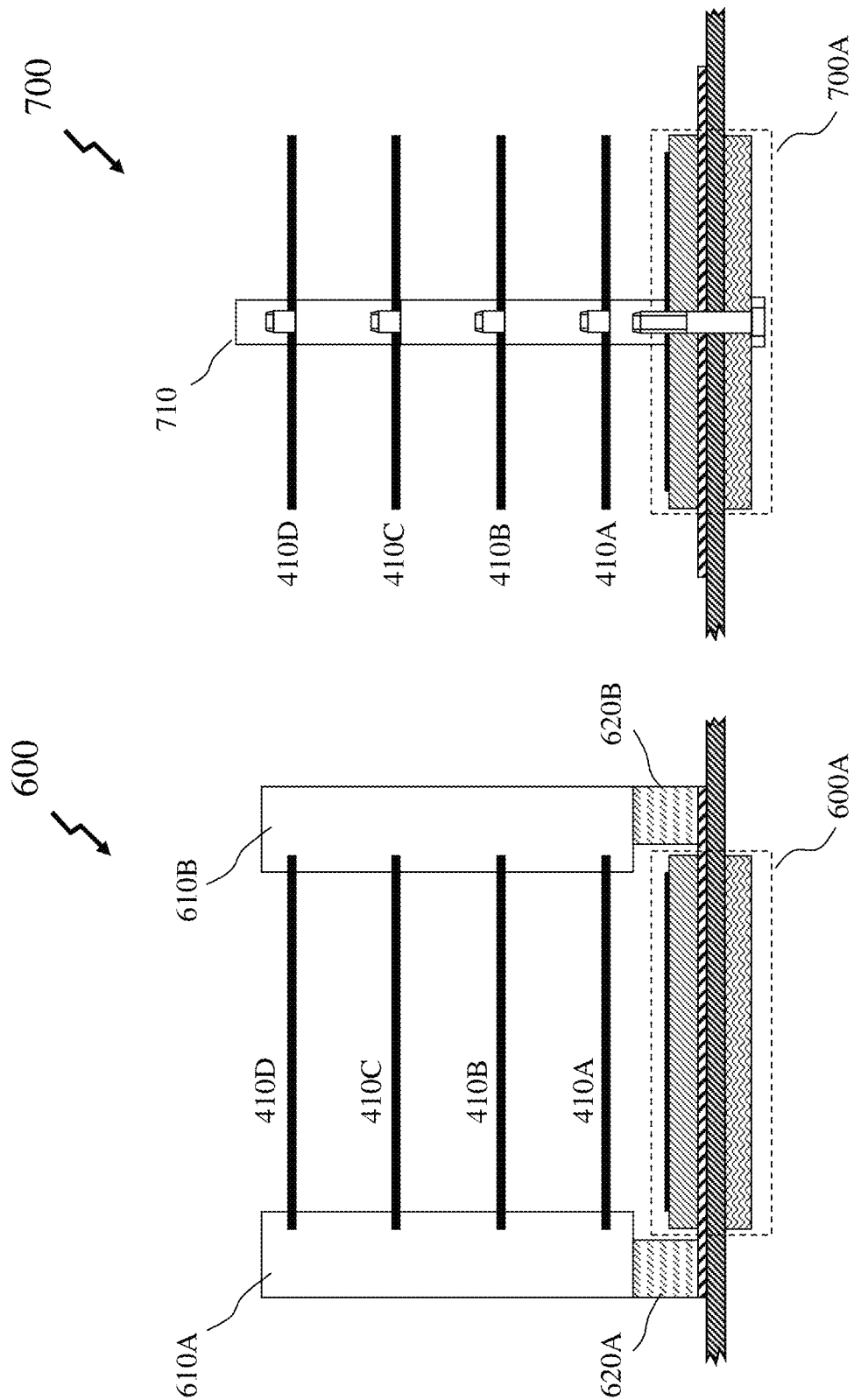

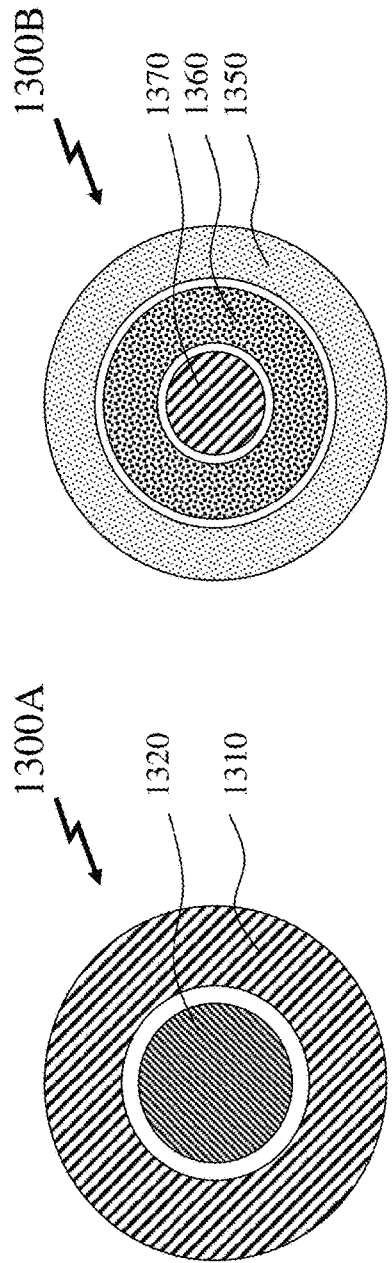
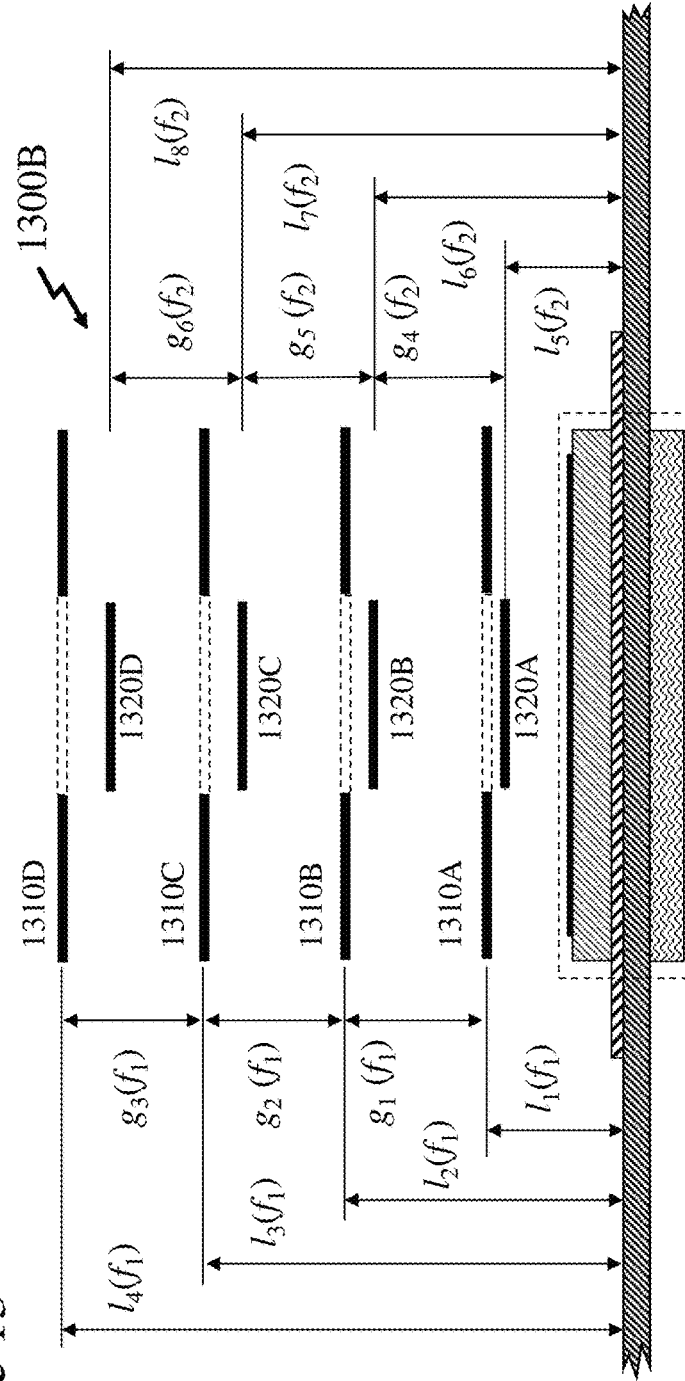
Figure 13

ANTI-JAMMING AND REDUCED INTERFERENCE GLOBAL POSITIONING SYSTEM RECEIVER METHODS AND DEVICES

CROSS-REFERENCE TO RELATED APPLICATIONS

This patent application claims the benefit of priority as a continuation of U.S. patent application Ser. No. 16/369,711 filed Mar. 29, 2019; which itself claims the benefit of priority from U.S. Provisional Patent Application 62/650,535 filed on Mar. 30, 2018, the entire contents of each being included herein by reference.

FIELD OF THE INVENTION

This patent application relates to patch antennas and more particularly to methods and devices for improving the anti jamming performance of patch antennas and patch antennas for global positioning systems.

BACKGROUND OF THE INVENTION

A global satellite navigation system (satnav) or global navigation satellite system (GNSS) is a system that exploits a network of autonomous geo-spatially positioned satellites to provide geolocation and time information to a suitable receiver anywhere on or near the Earth where there is an unobstructed line of sight. Whilst timing information can be obtained from line of sight to a single satellite geo-spatial location requires line of sight to three (at sea level) or four satellites as a minimum. Whilst the original motivation for satnav systems was for military purposes civil use of the systems was also allowed although until 2000 the United States Global Positioning System (GPS) that the military controlled signal degrading was removed although it may still be applied, and access may be selectively denied.

These factors led to a number of other systems being established with more in development. Accordingly, as of December 2016 only the United States' Global Positioning System (GPS), Russia's Global'naya Navigatsionnaya Sputnikovaya Sistema (GLONASS) and the European Union's Galileo were globally operational GNSS. However, China is in the process of expanding its regional BeiDou Navigation Satellite System into the global BeiDou-2 GNSS by 2020 and India (NAVigation with Indian Constellation—NAVIC), France and Japan (Quasi-Zenith Satellite System—QZSS) are in the process of developing regional navigation and augmentation systems as well. Accordingly, today there are well over 200 global navigation satellites in orbit for these GNSS. Table 1 below lists the primary operating frequencies of these systems.

TABLE 1

Operating Frequencies of GNSS Systems (Nearest 1 MHz)

| System | BeiDou | Galileo | GLONASS |
|---|---|---|---|
| Owner | China | Europe | Russia |
| Freq. | 1.561 GHz (B1) | 1.164-1.215 GHz (E5a/E5b) | ~1.602 GHz (SP) |
|  | 1.590 GHz | 1.260-1.300 GHz (E6) | ~1.246 GHz (SP) |
|  | 1.207 GHz (B2) | 1.559-1.592 GHz (E2-L1-E11) |  |
|  | 1.269 GHz (B3) |  |  |
| Precision | 10 m (Public) | 1 m (Public) | 4.5 m-7.4 m |
|  | 0.1 m (Encrypted) | 0.01 m (Encrypted) |  |

| System | GPS | NAVIC |
|---|---|---|
| Owner | USA | India |
| Freq. | 1.57542 GHz (L1) | 1.176 GHz (L5) |
|  | 1.2276 GHz (L2) | 2.492 GHz (S) |
|  | 1.176 GHz (L5) |  |
| Precision | 15 m | 10 m (Public) |
|  |  | 0.1 m (Encrypted) |

By providing location and time information in all weather conditions, GNSS signals are now used in a variety of civil industries and applications from construction and surveying, in-car and smartphone navigation, oil, gas, agriculture etc. Already by 2010 the number of GPS receivers had surpassed 1 billion and is probably closer to 2 billion with consideration of GNSS receivers within consumer electronics such as smartphones, motor vehicles, activity, and fitness trackers etc. However, GNSS signals are transmitted from published radio frequencies from geo-stationary satellites 20,000 km above the earth and transmit at low powers by terrestrial microwave and RF system perspectives and these signals are weakened by the area of the earth's surface covered, atmospheric absorption, etc. such that the signals received are fundamentally weak. Accordingly, this low signal level makes GNSS receivers vulnerable to accidental and deliberate interference from a range of synthetic sources, such as jammers, transmitters in adjacent bands, other radio-navigation satellite signals, etc. as well as natural sources such as solar activity and geomagnetic storms.

Within the anti-jamming technologies are controlled reception pattern antennas, adaptive antennas, null-steering antennas, and beamforming antennas which predominantly exploit phased array antennas to generate highly directional antenna receiver responsivity pattern with azimuthal angle which are static or tunable (dynamic). However, such systems are expensive and incompatible with many lower cost and footprint limited applications. In many applications the GNSS antenna is mounted upon a fixed or mobile element such as a building, mast, vehicle, etc. Accordingly, accidental, and intentional jammers tend to be in the plane of the antenna or below it.

Accordingly, it would be beneficial to improve the anti jamming or interference performance of GNSS receivers by further reducing the responsivity of the GNSS receiver to signals in-plane or below the plane of the antenna.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to patch antennas and more particularly to methods and devices for improving the anti jamming performance of patch antennas and patch antennas for global positioning systems.

In accordance with an embodiment of the invention there is provided an antenna comprising:

a patch antenna comprising an upper electrode disposed atop a dielectric body;

a ground plane disposed below the dielectric body of the patch antenna at a predetermined distance from the upper electrode;

a plurality of conductive elements (directors), each director disposed at a predetermined separation from the ground plane and substantially parallel to the upper surface of the batch antenna.

In accordance with an embodiment of the invention there is provided an antenna comprising:

a patch antenna comprising an upper electrode disposed atop a dielectric body operating at least at a first frequency band and a second frequency band;

a ground plane disposed below the dielectric body of the patch antenna at a predetermined distance from the upper electrode;

a plurality of first conductive elements (directors), each first director disposed at a predetermined separation from the ground plane and substantially parallel to the upper surface of the batch antenna; and a plurality of second conductive elements (directors), each second director comprising an opening within the central region of predetermined dimension, disposed substantially around the plurality of first directors at a predetermined separation from the ground plane, and substantially parallel to the upper surface of the batch antenna.

In accordance with an embodiment of the invention there is provided a method of reducing the gain of a patch antenna at a predetermined elevation by providing a parasitically coupled structure.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1A depicts examples of global navigation satellite system (GNSS) receivers for precision timing applications;

FIG. 1B depicts examples of patch antennas for GNSS receivers;

FIG. 6 depicts an external mechanical assembly for holding a plurality of directors for an inventive antenna such as that depicted in FIG. 4 prior to enclosure with a radome;

FIG. 7 depicts a single central mechanical assembly for holding a plurality of directors for an inventive antenna such as that depicted in FIG. 4 prior to enclosure with a radome;

FIG. 13 depicts a schematic of the addition of directors above the active electrical plane of a patch antenna according to an embodiment of the invention for a dual frequency or dual band system;

DETAILED DESCRIPTION

Figure 2B:
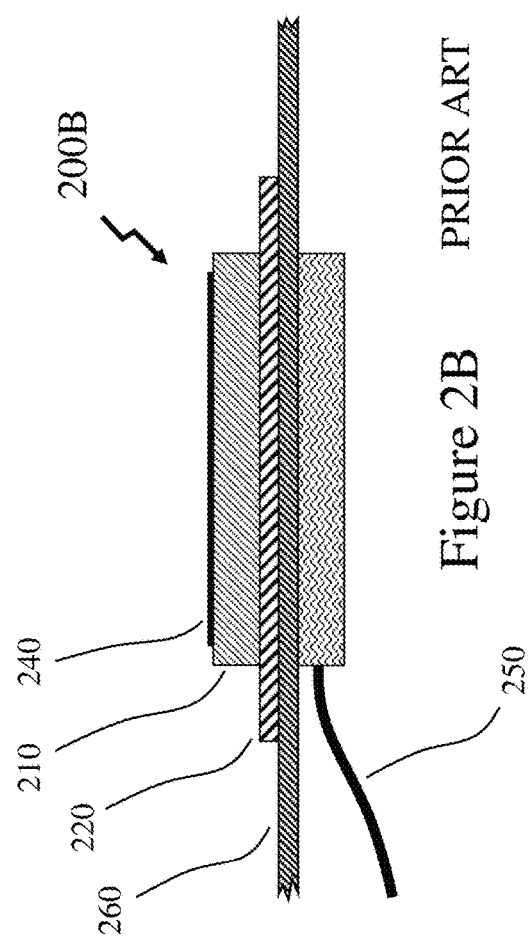
FIG. 2B depicts the addition of a ground plane to a patch antenna for a GNSS receiver.

The present invention is directed to patch antennas and more particularly to methods and devices for improving the anti jamming performance of patch antennas and patch antennas for global positioning systems.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including," "comprising," "consisting" and grammatical variants thereof do not preclude the addition of one or more components, features, steps, integers, or groups thereof and that the terms are not to be construed as specifying components, features, steps, or integers. Likewise, the phrase "consisting essentially of," and grammatical variants thereof, when used herein is not to be construed as excluding additional components, steps, features integers or groups thereof but rather that the additional features, integers, steps, components, or groups thereof do not materially alter the basic and novel characteristics of the claimed composition, device, or method. If the specification or claims refer to "an additional" element, that does not preclude there being more than one of the additional element.

As discussed above GNSS receivers are exploited within a wide range of applications within both the civil and military markets. Accordingly, these may range from small footprint low-cost consumer receivers for smartphones, fitness trackers etc. through to high accuracy high gain receivers specifically designed for timing and/or location. Referring to FIG. 1A there are depicted examples of antennas for timing applications within high density cell/telecommunications tower applications wherein the GNSS receiver is housed within a plastic transparent to wireless signals in the frequencies of interest as listed in Table 1 above. Such a cover being commonly referred to as a radome. A radome being a dome or other structure protecting radar equipment and made from material transparent to radio waves. Accordingly, GNSS antennas such as those depicted within first to fourth images 110 to 140 respectively are designed to provide an industrial grade weather proof enclosure with options for mounting and including a microwave connector on the bottom. These will typically contain in addition to a wideband patch antenna element a high gain (e.g., 40 dB or 50 dB) low noise amplifier (LNA) and a high rejection low loss out-of-band filter (e.g., a surface acoustic wave (SAW) filter).

According to the requirements of the GNSS antenna a patch antenna such as depicted by first to fifth patch antenna elements 150 to 190 may be employed for the wideband patch antenna element. These being:

First patch antenna element 150 being a single band circular patch antenna for GPS L1 and GLONASS G1 signals (Tallysman Wireless TW2405);

Second patch antenna element 160 being a single band square patch antenna for GPS L1 and GLONASS G1 signals (Tallysman Wireless TW1320);

Third patch antenna element 170 being a dual band circular antenna for GPS L1/L2, GLONAS G1/G2, Galileo D1 and BeiDuo B1 signals (Tallysman Wireless TW1829);

Fourth patch antenna element 180 being a dual band circular antenna for GPS L1/L2, GLONAS G1/G2, Galileo E1 and BeiDuo B1/B2 signals (Tallysman Wireless TW3887); and Fifth patch antenna element 190 being a triple band circular antenna for GPS L1/L2/L5, GLONAS G1/G2/G3, Galileo E1/E5, BeiDuo B1/B2 signals and L-band correction service coverage (Tallysman Wireless TW3970).

Not depicted are reference antennas that provide broadband coverage such as Tallysman Wireless VP6000 which provides coverage for all GNSS signals plus L-band with a first window at 1164-1300 MHz and a second window at 1525-1610 MHz. Alternatively, the VP6200 provides for an antenna for GPS L1/L2/L5, GLONASS G1/G2/g3, Galileo E1/E5a+b, BeiDou B1/B2+L-band correction (1164-1254 MHz+1525-1610 MHz) signals.

Figure 2D:
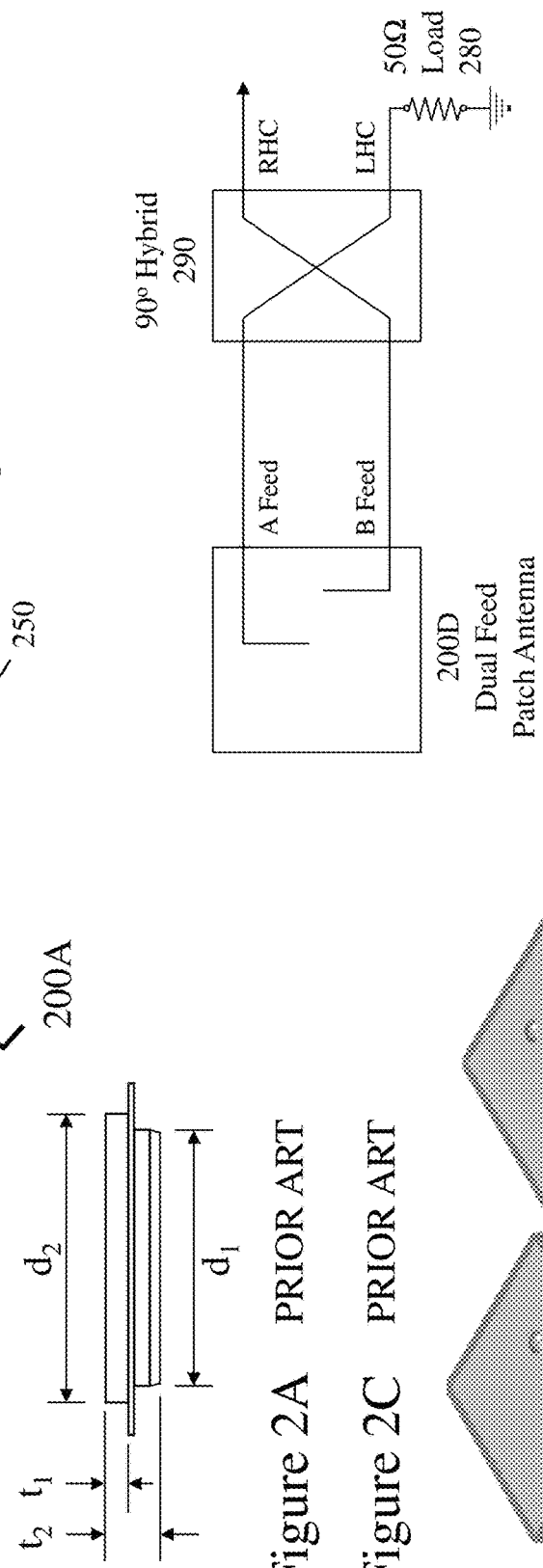
FIG. 2D depicts a dual feed patch antenna in combination with a 90° hybrid for extracting the right hand circular polarization signal.
Figure 2A:
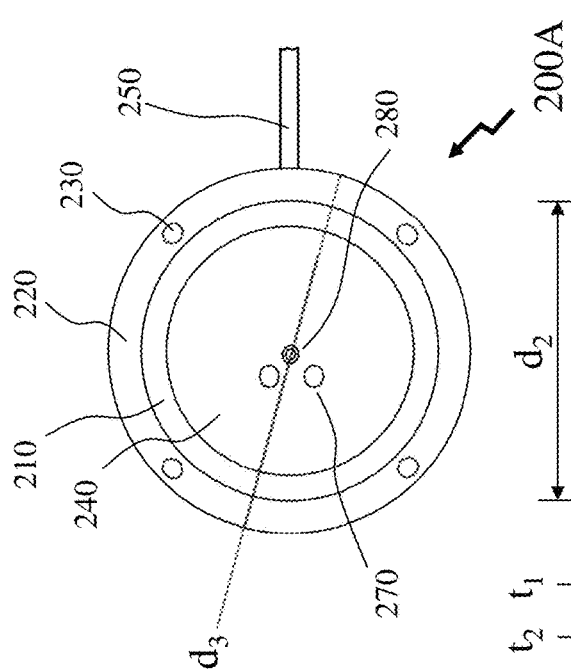
FIG. 2A depicts a typical mechanical configuration for a patch antenna for a GNSS receiver.

Referring to FIG. 2A there is depicted a typical circular patch antenna 200A in plan and side elevation views wherein the circular patch antenna 200A comprises a dielectric disc 210 with an upper surface metallization 240, mounted directly upon a Printed Circuit Board (PCB) 220 with mounting holes 230 around the periphery and an electrical connection 250 to a low noise amplifier contained with a metal shielding can visible in the side elevation view, beneath the PCB 220. Optionally, the PCB 220 may be provided without mounting holes 230 in order to reduce overall dimensions for example. With reference to FIG. 2A, Table 2 presents typical dimensions for the first patch antenna element 150 in FIG. 1B.

TABLE 2

Dimensions for an Example of a Single Band Circular Patch Antenna

| Dimension | Value |
| --- | --- |
| $d_1$ (shielding can) | 41 mm |
| $d_2$ (patch element) | 46 mm |
| $d_3$ (PCB Diameter) | 49.75 mm |
| $t_1$ (patch thickness) | 7.6 mm |
| $t_2$ (patch + housing thickness) | 4.0 mm |

In most applications the patch antenna is employed in conjunction with an additional ground plane, in close proximity to the integrated PCB 220 in order to enhance the antenna gain in the hemisphere above the ground plane, typically by 3 dB to 5 dB. As evident the sensitivity below the plane of the patch antenna is reduced by the use of a ground plane. As depicted in FIG. 2B the patch antenna 200B includes an additional ground plane 260 in close proximity (sometimes connected, but not necessarily) to which the antenna PCB 220, shown in FIG. 2A is attached. Accordingly, the electrical connection 250 in FIG. 2B is below the ground plane and is connected to an LNA contained in the shielding package shown below the additional ground plane 260, whilst the upper electrode 240 of the patch antenna is above the ground plane.

Figure 2C:
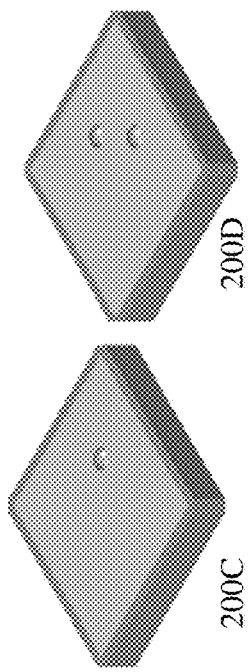
FIG. 2C depicts single feed and dual feed patch antennas for GNSS receivers.

Also depicted in FIG. 2A are feed connections 270 for the patch antenna as well as a central mounting hole to allow the patch antenna to be mounted in different configurations. As depicted in FIG. 2C a patch antenna may exploit a single feed or dual feeds as depicted in first and second imaged 200C and 200D, respectively. A single feed structure elicits an antenna response which is circular from the patch antenna as a of result critical coupling of the two axes through either the pin location and/or by strategically placed chamfers to the patch corners. A dual feed structure in which each feed is sited on a principle axis so as to constitute two linear, orthogonal antennas yields two feeds which are may then be combined with a 90° hybrid 290 such as depicted in FIG. 2D. Accordingly, the dual feeds, denoted as A Feed and B Feed, from a dual feed patch antenna 200D are coupled to the 90° hybrid 290 wherein they are combined resulting in the output signals for the right hand circular (RHC) polarization and left hand circular (LHC) polarisation on the two outputs of the 90° hybrid 290. As GNSS signals are right hand circularly polarized then the RHC output is exploited in the subsequent electronics whilst the LHC signal is coupled to ground via a load impedance, e.g., 50Ω load 280.

Accordingly, for embodiments of the invention described below and depicted with respect to FIGS. 3 to 14 for GNSS patch antennas, be they single frequency, single band, multi-frequency, multiple bands, etc. the pair of linear orthogonal antennas with the dual feed structure imposes the requirement that the patch antenna is circular, square, octagonal, dodecagonal etc. These and other geometries which may be employed exhibiting symmetry for a 90° rotation. Accordingly, other geometries may be employed including a PCB etc. and maintain the 90° rotation symmetry.

However, it would evident that for other patch antennas without the dual feed structure and pair of linear orthogonal antennas that other geometries of patch antenna may be employed.

Figure 4:
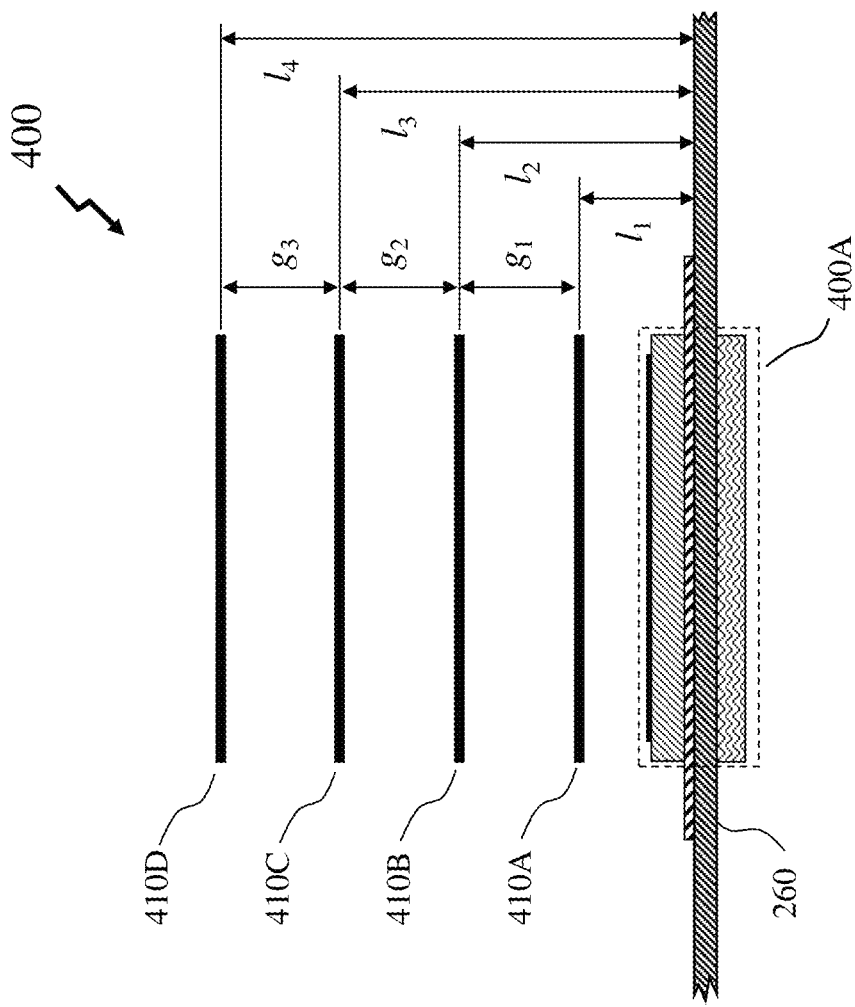
FIG. 4 depicts a schematic of the addition of conductive planes (directors) above the active electrical plane of a patch antenna according to an embodiment of the invention.
Figure 3:
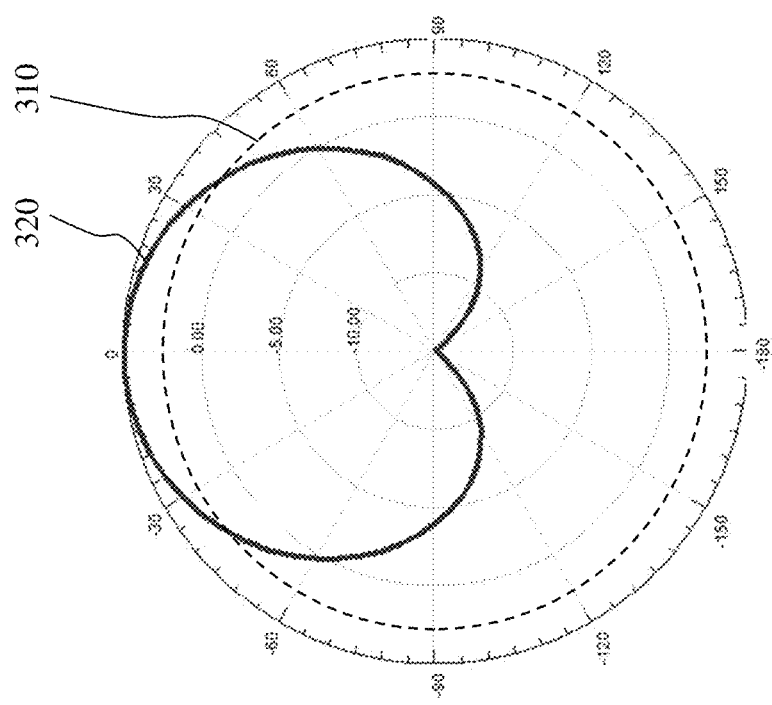
FIG. 3 depicts the typical radiation pattern of a patch antenna with ground plane.

Referring to FIG. 4 there is depicted a schematic of an embodiment of the invention wherein a plurality of conductors, depicted a first to fourth conductive planes (directors) 410A to 410D, are disposed above the upper electrode of the patch antenna 400A. As depicted these first to fourth conductive planes 410A to 410D are disposed at the following distances from the upper surface of the ground plane:

First conductive plane (director) 410A at $l_1$;
Second conductive plane (director) 410B at $l_2 = l_1 + g_1$;
Third conductive plane (director) 410C at $l_3 = l_1 + g_2 + g_1$; and
Fourth conductive plane (director) 410D at $l_4 = l_1 + g_3 + g_2 + g_1$.

Figure 5B:
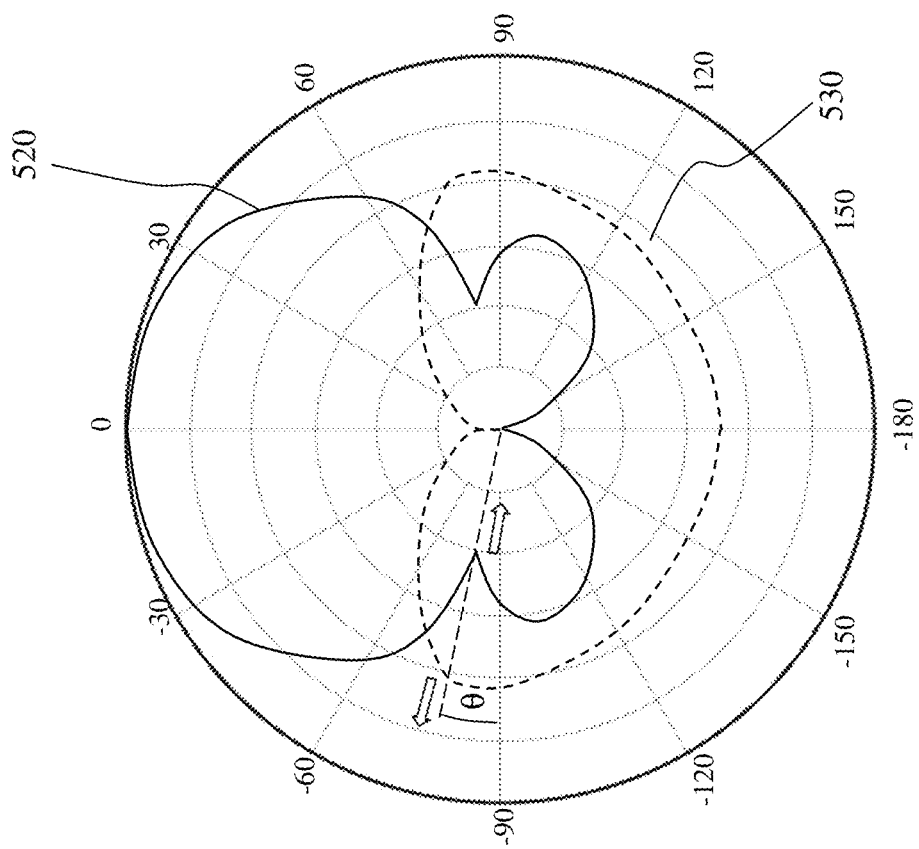
FIG. 5B depicts schematically the adjustment in radiation pattern for left hand circular and right hand circular polarisations with an inventive patch antenna with ground plane and a plurality of conductive planes (directors) with the patch antenna disposed between the ground plane and lowermost conductive plane (director)
Figure 5A:
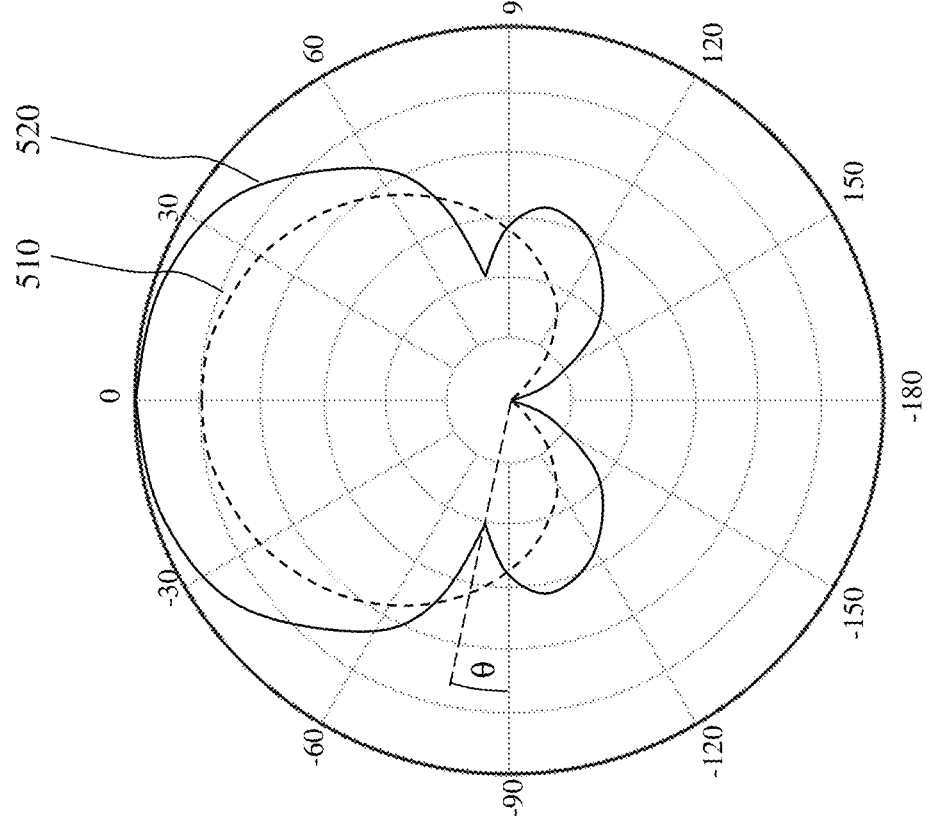
FIG. 5A depicts schematically the adjustment in radiation pattern for a prior art patch antenna with ground plane relative to the inventive patch antenna with ground plane and a plurality of conductive planes (directors) with the patch antenna disposed between the ground plane and lowermost conductive plane (director)

Accordingly, each of the first to fourth directors 410A to 410D acts as a parasitic element of the primary patch antenna 400A which is disposed between the fourth director 410D and the ground plane 260. Accordingly, with the appropriate gap(s); for example, $g = g_3 = g_2 = g_1$ or subsets of the gaps may be equal and other subsets at different gaps, then the directors as parasitic elements re-radiate their signals with slightly different phases to that of the driven patch antenna. Accordingly, whilst these are not driven, the amplitude and phase of the induced electrical signals on the parasitic elements are dependent upon the dimensions of the parasitic elements and their spacing both between themselves and to the driven element. Accordingly, the parasitic elements act to reinforce in the zenith direction of the antenna and reduce the gain in a direction at an angle relative to the plane of the antenna (i.e., the horizon for the antenna). Accordingly, as depicted in FIG. 5A the parasitic elements, for example first to fourth directors 410A to 410D, in combination with the ground plane act to alter the radiation pattern from that depicted by first curve 510, to that depicted by second curve 520, whereby the gain at zenith (0°) is increased and the gain at an elevation angle of Theta degrees above the horizon (−90° and 90°) is substantially reduced.

Within the ensuing descriptions of embodiments and in respect of FIGS. 6 to 17 the conductive planes are referred to as directors or parasitic elements are described. However, other embodiments may according to the performance of the receiver required, footprint and volume requirements, etc. exploit other numbers of directors such as 1, 2, 3, 5, 6, etc. The conductive planes (directors) are electrically conductive and hence may be formed from a metal with low resistance and low density such as aluminum for example although other metals and alloys may be employed for example provided that they achieve the desired cost and performance requirements of the product. Accordingly, within embodiments of the invention the directors may be also formed from copper, gold, silver, tungsten, steel, stainless steel etc. Optionally, the director may be formed from a thin film or thick film of a conductor upon a low dielectric material such as FR4, teflon (glass weave), teflon (polytetrafluoroethylene, PTFE), polypropylene, and polyamide for example.

Further, the conductive planes (directors) are described and depicted with respect to their being surrounded by air. However, other embodiments of the invention may exploit one or conductive planes embodied within insulating materials with high dielectric constants in order to reduce the size of the conductors and their spacing. Such materials may include ceramic, polyolefin, PTFE, polyetherimide (PEI), fused silica, sapphire, alumina, and beryllia for example.

Now referring to FIG. 6 there is depicted an external mechanical assembly for holding a plurality of directors for an inventive antenna such as that depicted in FIG. 4 prior to enclosure with a radome. Accordingly, as depicted the plurality of directors 410A to 410D are disposed substantially parallel to the upper surface of the patch antenna 600A and held within first and second frames 610A and 610B respectively which are atop first and second spacers 620A and 620B. First and second frames 610A and 610B may be the only pair of frames or may be two of a number of frames around the periphery of the directors holding them. For example, if the first and second frames 610A and 610B respectively subtend a relatively significant portion of the periphery, e.g., 30°, 45°, 60° for example, then the directors are restrained sufficiently in all directions. If the first and second frames 610A and 610B respectively subtend a relatively small portion of the periphery, e.g., 10°, 15° for example, then additional frames may be required to retain the directors in position in all directions. For example, 3, 4, 5, 6, etc.

As the current flowing within the directors will be circular within the director and highest at the periphery then the frames holding the directors should be non-conductive in order not to introduce losses via grounding the directors to the frames. Accordingly, the frames may be formed from a variety of non-conductive materials although the same material as the radome may in many instances be the simplest design option. Whilst single part designs for the first and second frames 610A and 610B are depicted alternate arrangements may be considered without departing from the scope of the invention.

Referring to FIG. 7 there is depicted a single central mechanical assembly for holding a plurality of directors for an inventive antenna such as that depicted in FIG. 4 prior to enclosure with a radome. Accordingly, the central mounting 710 may be attached via a central mounting hole within the patch antenna 700A via a screw, bolt etc. although other attachment means, assemblies may be considered. For example, the central mounting 710 may fit atop a frame with multiple "arms" that are attached to the ground plane or a frame within which or to which the ground plane and patch antenna 700A are attached. As the current flowing within the directors is around the periphery the current at their centers will be zero or near-zero such that a conductive material may be employed for the central mounting in addition to a non-conductive material. As depicted the central mounting 710 comprises multiple sections allowing each director to be mounted and then retained as the next element of the central mounting is attached etc. However, alternate arrangements may be considered without departing from the scope of the invention.

Figure 8:
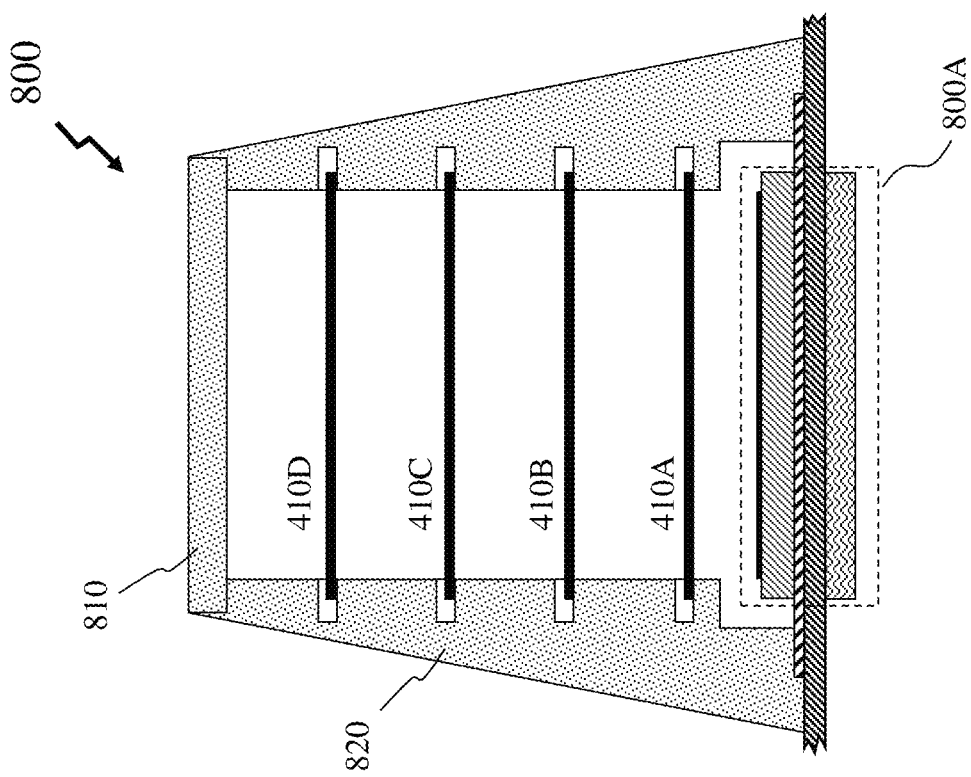
FIG. 8 depicts an external mechanical assembly for holding a plurality of directors for an inventive antenna such as that depicted in FIG. 4 wherein the directors are held within the radome.

Now referring to FIG. 8 there is depicted an external mechanical assembly for holding a plurality of directors for an inventive antenna such as that depicted in FIG. 6 wherein the directors are held within the radome rather than discrete frame(s) as described and depicted in FIG. 6 for example which are then enclosed within a radome. Accordingly, the "frame" and radome may be formed as a single piece part from an appropriate non-conductive material and the directors placed into the slots.

Figure 9:
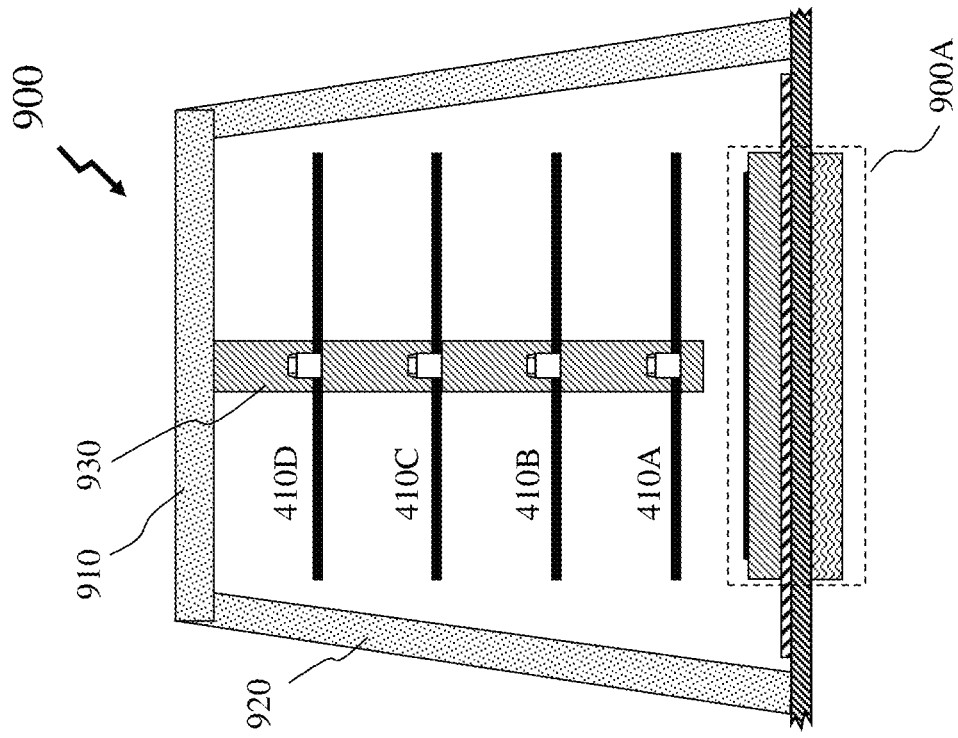
FIG. 9 depicts a single central mechanical assembly for holding a plurality of directors for an inventive antenna such as that depicted in FIG. 4 wherein the directors are held within the radome.

FIG. 9 there is depicted a single central mechanical assembly for holding a plurality of directors for an inventive antenna such as that depicted in FIG. 7 wherein the directors are held within the radome rather than discrete frame(s) as described and depicted in FIG. 6 for example which are then enclosed within a radome.

Figure 11:
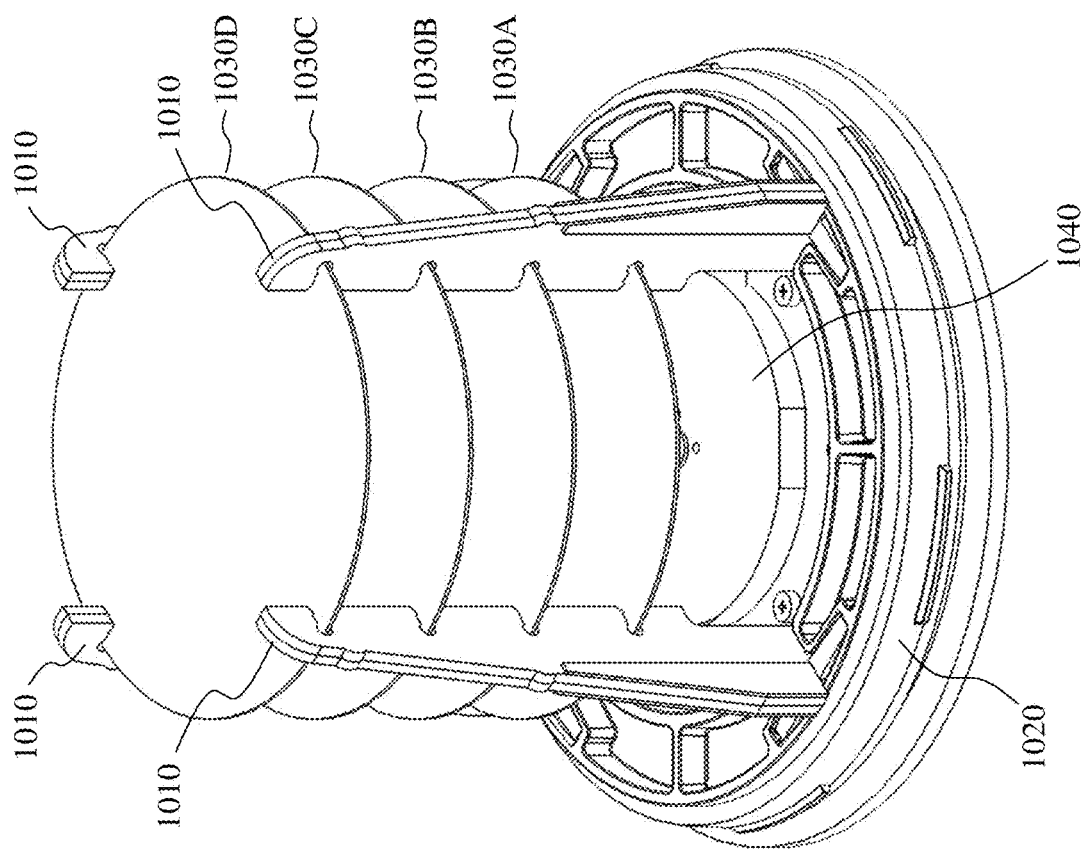
FIGS. 10 and 11 depict side elevation and perspective views of a patch antenna assembly comprising four mountings for the plurality of directors attached to a frame upon which the ground plane and patch antenna are also mounted.
Figure 10:
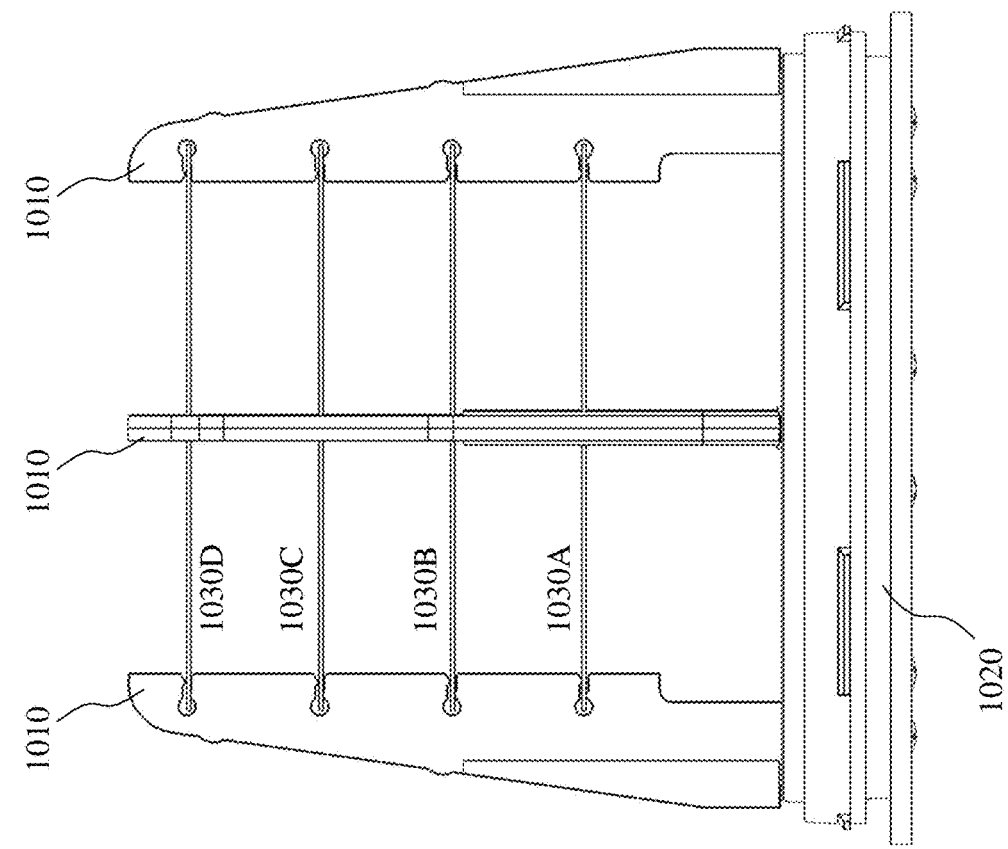
Figure 12B:
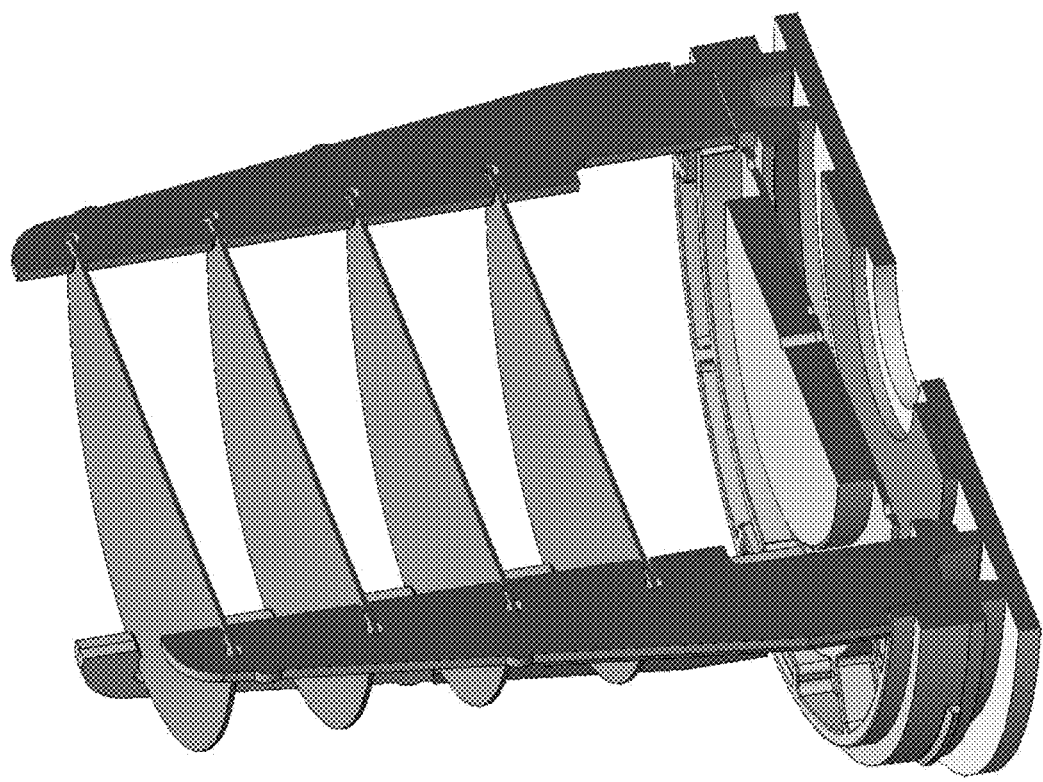
FIGS. 12A and 12B depict perspective cross-sectional views of the assembly depicted in FIGS. 10 and 11 with and without the radome.
Figure 12A:
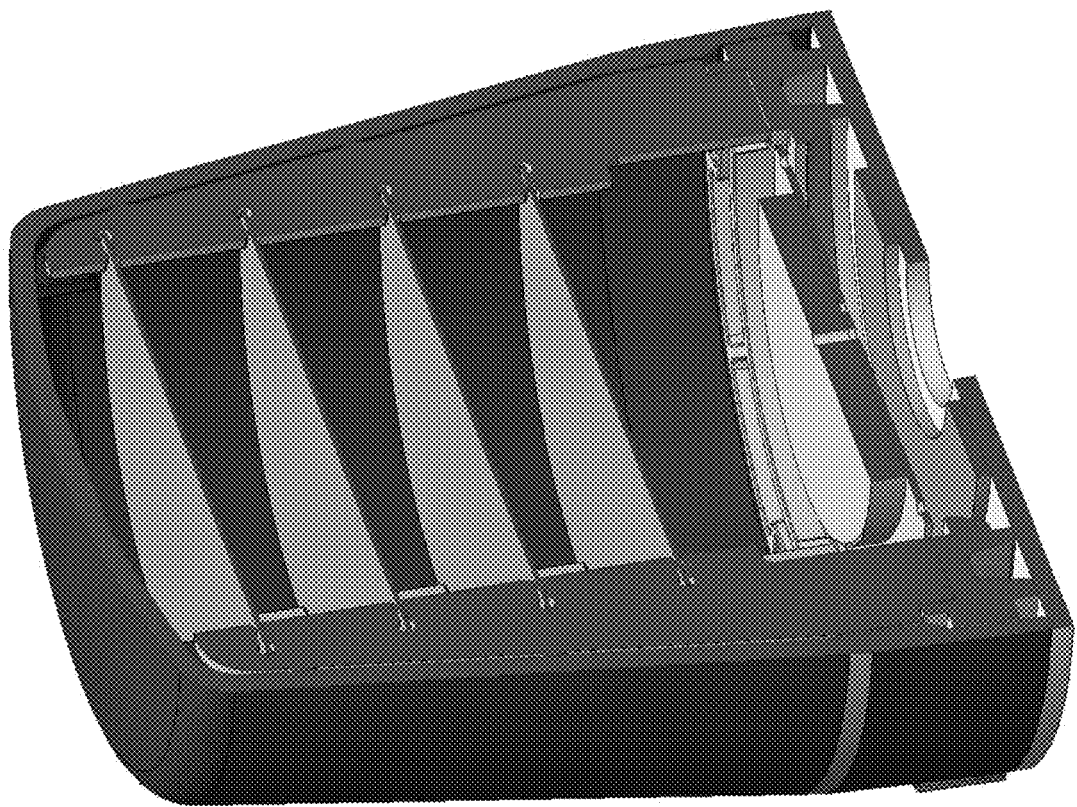

FIGS. 10 and 11 depict side elevation and perspective views of a patch antenna assembly comprising four mountings for the plurality of directors attached to a frame upon which the ground plane and patch antenna are also mounted. Accordingly, first to fourth directors 1030A to 1030D are depicted retained in position by four frames 1010 which are attached to a base structure 1020. The patch antenna 1040 and its ground plane (not identified) are mounted within the base structure 1020 and the microwave feed established through the bottom of the base structure 1020 although within other embodiments the microwave feed may be through the side wall of the base structure, for example. This configuration is also depicted in FIGS. 12A and 12B which respectively depict perspective cross-sectional views of the assembly with and without the radome.

Within the preceding descriptions and discussion in respect of FIGS. 4 and 6-12 a single set of conductive planes (directors) have been considered for a patch antenna addressing a single frequency or single band of operation, e.g., GPS L1+GLONASS L1, such as first and second patch antenna elements 150 and 160 in FIG. 1B. However, as noted above dual band and triple band patch antennas may be employed such as third to fifth patch antenna elements 170 to 190 respectively in FIG. 1B. Accordingly, referring to FIG. 13 there is depicted a schematic of the addition of directors above the active electrical plane of a patch antenna having similar radiation patterns and responses at multiple frequencies according to an embodiment of the invention for a dual frequency or dual band system. Accordingly, as depicted in first image 1300A an outer ring conductive plane 1310 (director) is employed in conjunction with an inner conductive plane 1320 (director). Accordingly, as depicted in second image 1300B the spacings for the first to fourth inner directors 1320A to 1320D respectively is different to that for the first to fourth outer directors 1310A to 1310D respectively due to the difference in frequency for the two GNSS signals. This concept could be extended as depicted in third image 1300C with outer ring directors 1350, middle ring directors 1360 and inner directors 1370.

Figure 14:
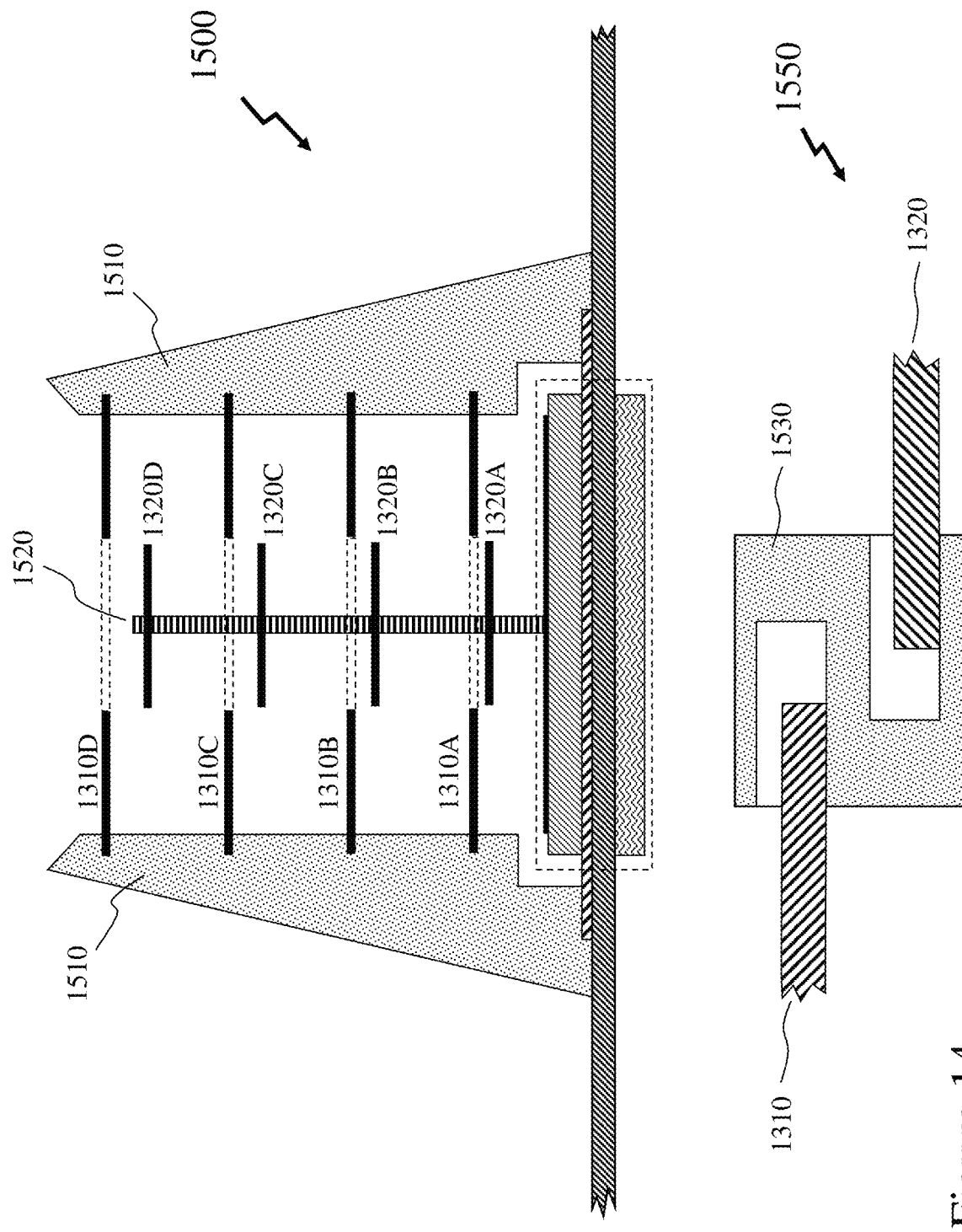
FIG. 14 depicts a mechanical assembly for holding the two sets of directors for an inventive antenna such as that depicted in FIG. 13 prior to enclosure with a radome.

Referring to FIG. 14 there is depicted a mechanical assembly 1500 for holding the two sets of directors for an inventive antenna such as that depicted in FIG. 13 prior to enclosure with a radome. Accordingly, in order to minimize the gap between the inner directors 1320A to 1320D and the outer ring directors 1310A to 1310D then the outer ring directors 1310A to 1310D exploit a non-conductive external frame mounting whilst the inner directors 1320A to 1320D exploit a central mounting. Alternatively, a non-conductive mounting may be employed to mount an inner director 1320A to 1320D with respect to its respective outer ring director 1310A to 1310D at the appropriate spacing and then these assemblies mounted with either an external frame or a central mounting. Such a connection being depicted in schematic 1550 wherein a connector 1530 couples the inner director 1320 to the outer ring director 1310. Such a connector 1530 as discussed supra in respect of the frames may according to the angle they subtend around the periphery of the inner director 1320 be only 2 such connectors or it may be 3, 4, 5, 6, etc. Optionally, it could be single ring connector.

As discussed supra the metallic directors and ground plane employed in conjunction with the patch antenna result in an improved performance in the zenith direction and the establishment of a null in the lower elevation of the RHC gain pattern for the antenna assembly thereby improving the anti jamming and interference performance of the GNSS antenna. The nearest configuration to this being a Yagi-Uda antenna configuration. pattern.

Figure 15:
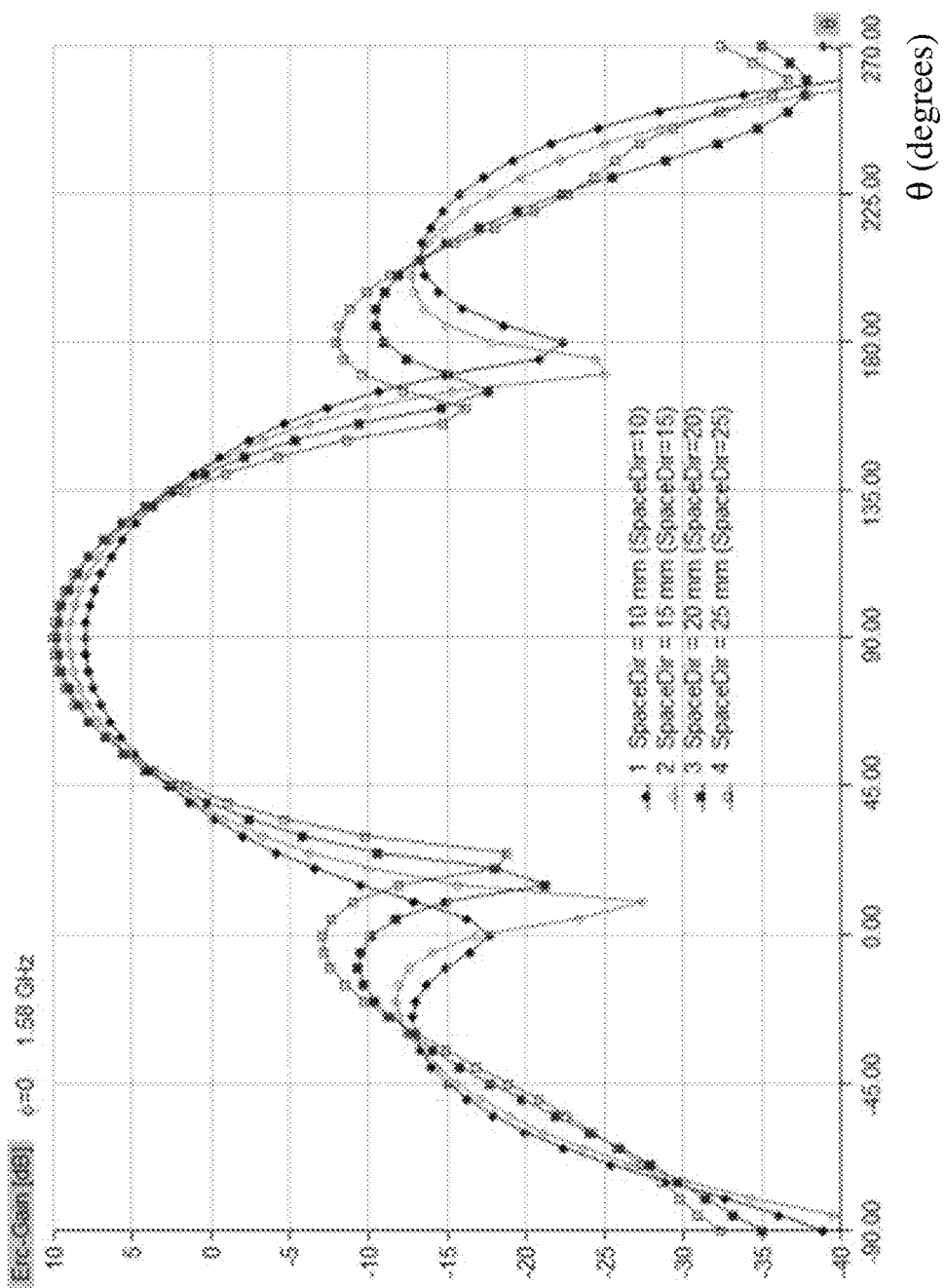
FIG. 15 depicts simulated gain pattern at 1580 MHz with different values of spacing between the directors for a multi-director design according to an embodiment of the invention in combination with a patch antenna.
Figure 16:
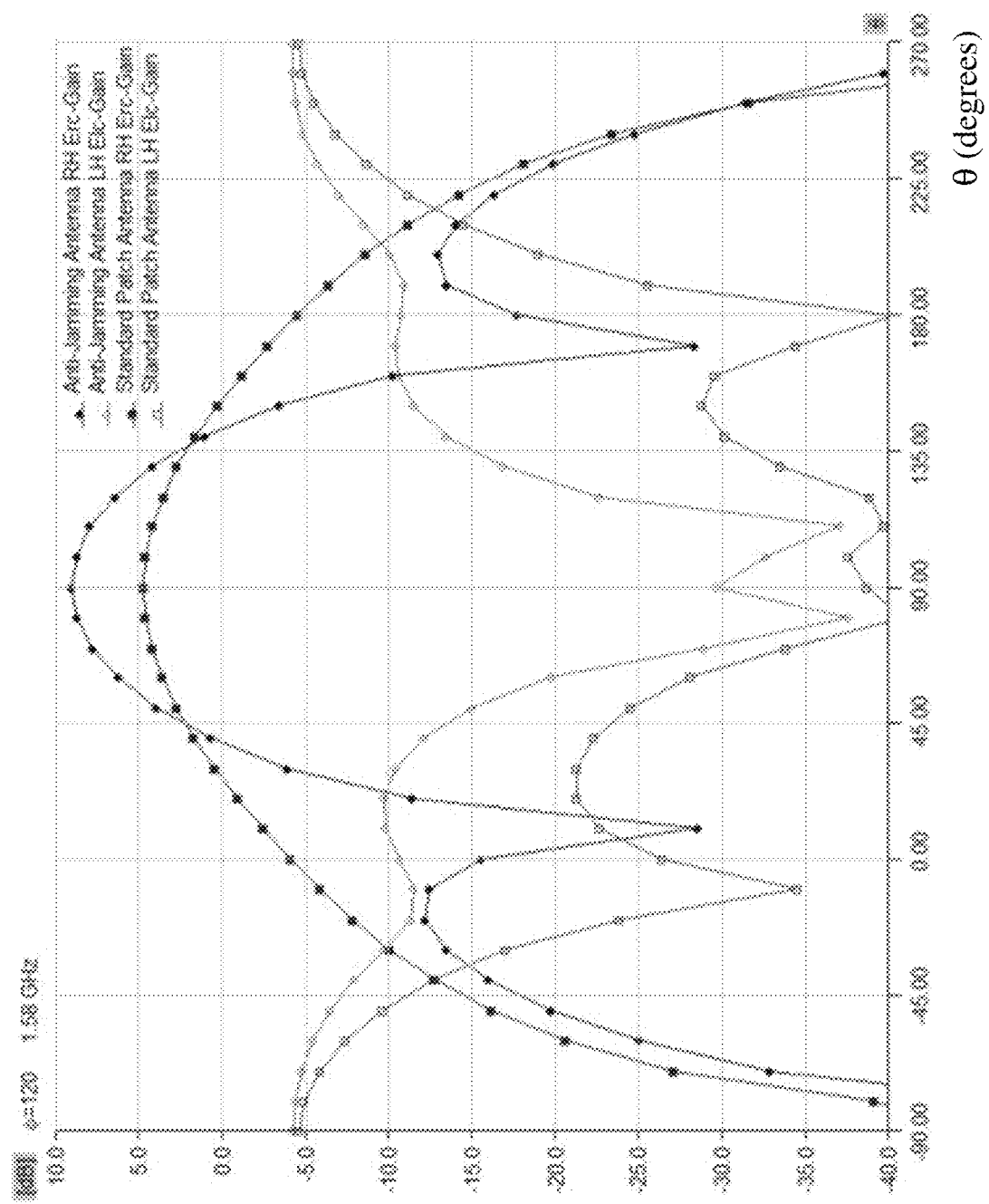
FIG. 16 depicts simulated gain patterns for left-hand and right-hand circular polarizations at 1580 MHz for a GNSS receiver exploiting multiple directors according to an embodiment of the invention compared to the same patch antenna without the multiple director assembly.
Figure 17:
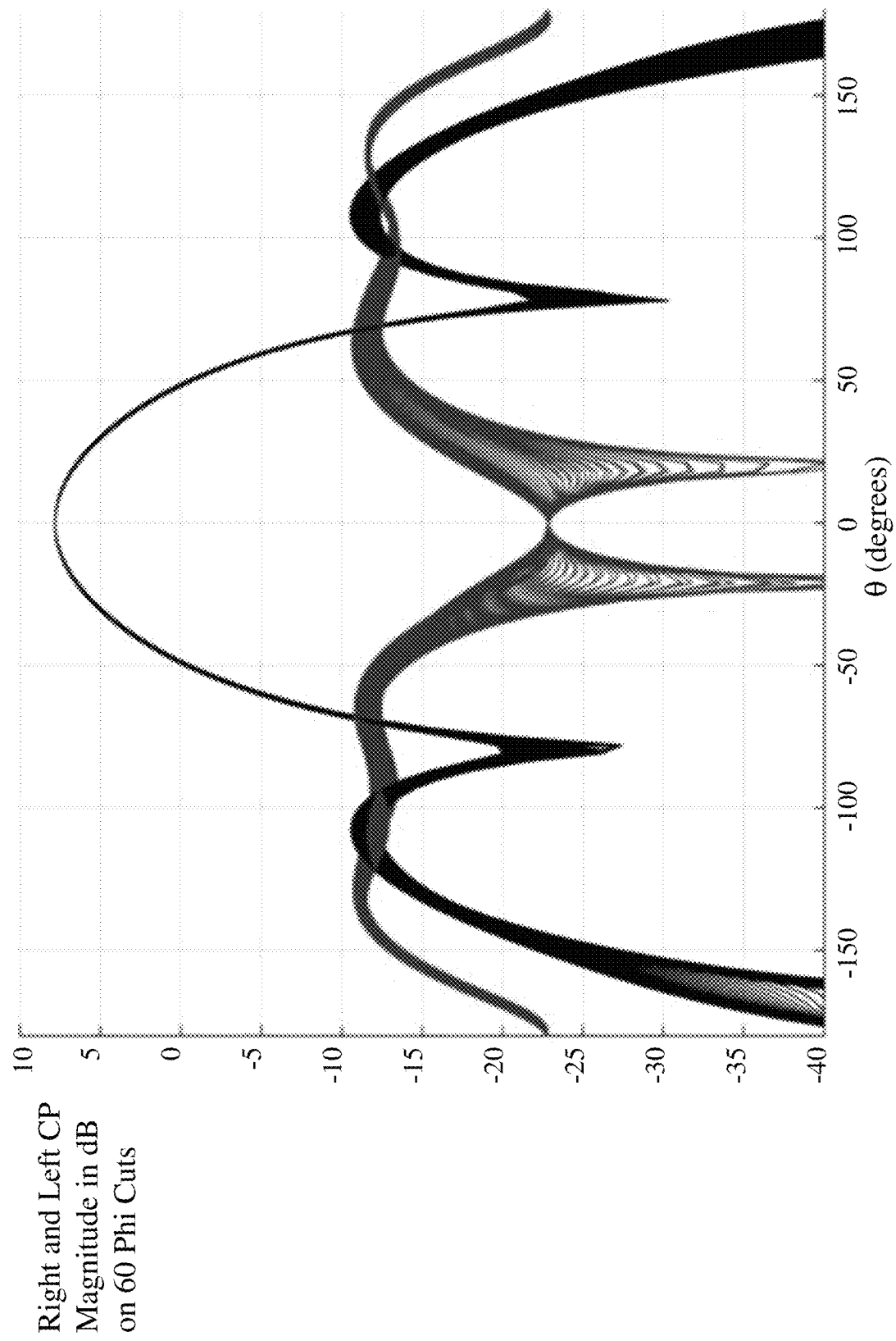
FIG. 17 depicts measured gain patterns along 60 azimuth cuts at 1580 MHz for left-hand and right-hand circular polarizations at 1580 MHz for a GNSS receiver exploiting multiple directors according to an embodiment of the invention.

Within the following description in respect of FIGS. 15 to 17 a design is presented which establishes a null close to the horizon where most of the terrestrial interfering signals are coming from and especially at an elevation of 15 degrees. It is light and very compact with a diameter of 100 mm, a height of 101 mm and a weight of less than 370 g. This design will be referred to subsequently as the anti jamming (AJ) GNSS (AJ-GNSS) antenna. As noted above the design methodology of a plurality of directors allows for establishing of a null towards the horizon where the nulling is established in dependence upon the spacing between the directors FIG. 15 shows the variation of the nulling angle from 0 degree to 25 degrees as the spacing between the directors is varied from 10 mm to 25 mm Also, it can be seen that maximum RHC gain at zenith varies from 7.9 dBic to 10 dBic.

The diameter of the directors will also have an impact on the gain pattern. Accordingly, the director diameter for the circular directors employed was set to optimize the response in the GNSS frequency band. As noted supra in respect of FIG. 5B adjusting the diameter and spacing of the directors to generate a very deep null in the gain pattern at the frequency of interest Now referring to FIG. 16 the simulated radiation gain patterns of an optimized AJ-GNSS for 1580 MHz operation and a standard GNSS patch antenna are depicted for operation at 1580 MHz. The gain patterns at other azimuth and frequencies in the higher GNSS band for this optimized AJ-GNSS similar. The AJ-GNSS exhibits a non-realized RHC gain at zenith from 8.7 dBic to 9.2 dBic which is close to 4 dB higher than the standard GNSS patch. Additionally, the radiation gain null from the inventive design with the plurality of directors is evident within the RHC gain pattern at an elevation angle of 15 degrees. The RHC gain at that elevation is more than 35 dB down relative to the maximum gain which represents an attenuation of approximately 25 dB compared to the standard GNSS patch at that elevation angle. The LHC gain is increased compared to the standard GNSS patch but usually stays 30 dB below the maximum RHC gain at zenith and −19 dB below at horizon.

The AJ-GNSS simulated in FIG. 16 was measured using an anechoic chamber wherein the resulting experimental results are depicted in FIG. 17. The measured gain pattern at 1580 MHz is in good agreement with the simulation results. Axial ratio is a measure of an antenna's ability to reject the cross polarized portion of a composite signal with both RHC and LHC components. The worst case axial ratio values of the AJ-GNSS according to an embodiment of the invention are less than 0.9 dB at the zenith in the whole higher GNSS frequency band. This performance provides for the excellent multipath rejection capability of the AJ-GNSS according to an embodiment of the invention.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the scope of the present invention.

What is claimed is:

1. An antenna comprising:
   an upper electrode disposed atop a dielectric body operating at a plurality of frequencies;
   a ground plane disposed below the dielectric body of the antenna at a predetermined distance from the upper electrode; and
   a plurality of sets of conductive elements where each set of conductive elements comprises a plurality of conductive planes where each conductive plane of the plurality of conductive planes in a set of conductive elements are disposed at a predetermined constant spacing relative to one another and a conductive plane of the plurality of conductive planes nearest the ground plane is disposed with the predetermined constant spacing from the ground plane; wherein
   an antenna gain of the antenna at a frequency of the plurality of frequencies has a radiation gain null at a predetermined elevation determined in dependence upon the predetermined constant spacing of a predetermined set of conductive elements of the plurality of sets of conductive elements.

2. The antenna according to claim 1, wherein
   a first set of conductive elements of the plurality of sets of conductive elements are circular; and
   each other set of conductive elements of the plurality of sets of conductive elements is a series of annular rings of defined inner radius and defined outer radius; and
   the plurality of sets of conductive elements do not overlap radially from a longitudinal axis along which the plurality of sets of conductive elements are disposed.

3. The antenna according to claim 1, further comprising
   a plurality of sets of electrically non-conductive connectors; wherein
   a first set of conductive elements of the plurality of sets of conductive elements are circular; and
   each other set of conductive elements of the plurality of sets of conductive elements is a series of annular rings of defined inner radius and defined outer radius; and
   the plurality of sets of conductive elements do not overlap radially from a longitudinal axis along which the plurality of sets of conductive elements are disposed;
   each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements; and
   the set of conductive elements of the plurality of sets of conductive elements having the outermost annular rings are mounted to a plurality of electrically non-conductive mounting elements disposed at predetermined positions around the periphery of the plurality of sets of conductive elements.

4. The antenna according to claim 1, further comprising
   a plurality of sets of electrically non-conductive connectors; wherein a first set of conductive elements of the plurality of sets of conductive elements are circular; and each other set of conductive elements of the plurality of sets of conductive elements is a series of annular rings of defined inner radius and defined outer radius; and the plurality of sets of conductive elements do not overlap radially from a longitudinal axis along which the plurality of sets of conductive elements are disposed;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements; and the first set of conductive elements of the plurality of sets of conductive elements are mounted to a central electrically non-conductive mounting substantially perpendicular the upper electrode and passing through the centre of each conductive element within the first set of conductive elements of the plurality of sets of conductive elements.

5. The antenna according to claim 1, further comprising a plurality of sets of electrically non-conductive connectors; wherein a first set of conductive elements of the plurality of sets of conductive elements are circular; and each other set of conductive elements of the plurality of sets of conductive elements is a series of annular rings of defined inner radius and defined outer radius; and the plurality of sets of conductive elements do not overlap radially from a longitudinal axis along which the plurality of sets of conductive elements are disposed;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements;

the first set of conductive elements of the plurality of sets of conductive elements are mounted to a central electrically non-conductive mounting substantially perpendicular the upper electrode and passing through the centre of each conductive element within the first set of conductive elements of the plurality of sets of conductive elements; and the set of conductive elements of the plurality of sets of conductive elements having the outermost annular rings are mounted to a plurality of electrically non-conductive mounting elements disposed at predetermined positions around the periphery of the plurality of sets of conductive elements.

6. An antenna comprising:

an upper electrode disposed atop a dielectric body and a ground plane disposed at a predetermined distance from the upper electrode below the upper electrode; and a plurality of conductive elements disposed above the upper electrode where the plurality of conductive elements are disposed at a constant spacing relative to one another and the conductive element of the plurality of conductive elements nearest the ground plane is disposed with the constant spacing from the ground plane; wherein each conductive element of the plurality of conductive elements is substantially parallel to the upper electrode;

a gain of the antenna at a zenith is increased relative to the antenna gain at the zenith for the antenna alone;

the gain of the antenna has a null at a predetermined elevation established in dependence upon the constant spacing of each conductive element relative to its neighbours within the plurality of conductive elements.

7. The antenna according to claim 6, wherein the plurality of conductive elements are mounted to a central mounting which is substantially perpendicular to the upper electrode and passing through the centre of each conductive element.

8. The antenna according to claim 6, wherein each conductive element of the plurality of conductive elements has a predetermined geometry that exhibits symmetry for a 90° rotation.

9. The antenna according to claim 8, wherein the central mounting is at least one of electrically conductive and electrically non-conductive.

10. The antenna according to claim 6, wherein the plurality of conductive elements are mounted to a plurality of mounting elements disposed at predetermined positions around the periphery of the conductive elements.

11. The antenna according to claim 10, wherein the plurality of mounting elements are electrically non-conductive.

12. An antenna comprising:

an upper electrode disposed atop a dielectric body operating at a plurality of frequencies;

a ground plane disposed below the dielectric body at a predetermined distance from the upper electrode; and one or more sets of conductive elements where each set of conductive elements comprises a plurality of conductive planes where each conductive plane of the plurality of conductive planes in a set of conductive elements are disposed at a predetermined constant spacing relative to one another and a conductive plane of the plurality of conductive planes nearest the ground plane is disposed with the predetermined constant spacing from the ground plane; wherein an antenna gain of the antenna at a subset of the plurality of frequencies has a radiation gain null at a predetermined elevation determined in dependence upon the predetermined constant spacing of a predetermined set of conductive elements of the one or more sets of conductive elements.

13. The antenna according to claim 12, wherein a first set of conductive elements of the one or more sets of conductive elements are of a predetermined geometry; and any other set of conductive elements of the one or more sets of conductive elements is a series of annular implementations of the predetermined geometry; and the one or more sets of conductive elements do not overlap radially from a longitudinal axis along which the one or more sets of conductive elements are disposed; and the predetermined geometry exhibits symmetry for a 90° rotation.

14. The antenna according to claim 12, further comprising a plurality of sets of electrically non-conductive connectors; wherein a first set of conductive elements of the one or more sets of conductive elements are of a predetermined geometry;

any other set of conductive elements of the one or more sets of conductive elements is a series of annular implementations of the predetermined geometry;

the one or more sets of conductive elements do not overlap radially from a longitudinal axis along which the one or more sets of conductive elements are disposed;

the predetermined geometry exhibits symmetry for a 90° rotation;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements; and the set of conductive elements of the one or more sets of conductive elements having the outermost annular rings are mounted to a plurality of electrically non-conductive mounting elements disposed at predetermined positions around the periphery of the one or more sets of conductive elements.

15. The antenna according to claim 12, further comprising a plurality of sets of electrically non-conductive connectors; wherein a first set of conductive elements of the one or more sets of conductive elements are of a predetermined geometry;

any other set of conductive elements of the one or more sets of conductive elements is a series of annular implementations of the predetermined geometry;

the one or more sets of conductive elements do not overlap radially from a longitudinal axis along which the one or more sets of conductive elements are disposed;

the predetermined geometry exhibits symmetry for a 90° rotation;

the one or more sets of conductive elements do not overlap radially from a longitudinal axis along which the one or more sets of conductive elements are disposed;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements; and the first set of conductive elements of the one or more sets of conductive elements are mounted to a central electrically non-conductive mounting substantially perpendicular the upper electrode and passing through the centre of each conductive element within the first set of conductive elements of the one or more sets of conductive elements.

16. The antenna according to claim 12, further comprising a plurality of sets of electrically non-conductive connectors; wherein a first set of conductive elements of the one or more sets of conductive elements are of a predetermined geometry;

any other set of conductive elements of the one or more sets of conductive elements is a series of annular implementations of the predetermined geometry;

the one or more sets of conductive elements do not overlap radially from a longitudinal axis along which the one or more sets of conductive elements are disposed;

the predetermined geometry exhibits symmetry for a 90° rotation;

the one or more sets of conductive elements do not overlap radially from a longitudinal axis along which the one or more sets of conductive elements are disposed;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements;

the first set of conductive elements of the one or more sets of conductive elements are mounted to a central electrically non-conductive mounting substantially perpendicular the upper electrode and passing through the centre of each conductive element within the first set of conductive elements of the one or more sets of conductive elements; and the set of conductive elements of the one or more sets of conductive elements having the outermost annular rings are mounted to a plurality of electrically non-conductive mounting elements disposed at predetermined positions around the periphery of the one or more sets of conductive elements.

17. The antenna according to claim 12, wherein a first set of conductive elements of the one or more sets of conductive elements are of a predetermined geometry; and any other set of conductive elements of the one or more sets of conductive elements is a series of annular implementations of the predetermined geometry; and the predetermined geometry exhibits symmetry for a 90° rotation.

18. The antenna according to claim 12, further comprising a plurality of sets of electrically non-conductive connectors; wherein a first set of conductive elements of the one or more sets of conductive elements are of a predetermined geometry;

any other set of conductive elements of the one or more sets of conductive elements is a series of annular implementations of the predetermined geometry;

the predetermined geometry exhibits symmetry for a 90° rotation;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements; and the set of conductive elements of the one or more sets of conductive elements having the outermost annular rings are mounted to a plurality of electrically non-conductive mounting elements disposed at predetermined positions around the periphery of the one or more sets of conductive elements.

19. The antenna according to claim 12, further comprising a plurality of sets of electrically non-conductive connectors; wherein a first set of conductive elements of the one or more sets of conductive elements are of a predetermined geometry;

any other set of conductive elements of the one or more sets of conductive elements is a series of annular implementations of the predetermined geometry;

the predetermined geometry exhibits symmetry for a 90° rotation;

the one or more sets of conductive elements do not overlap radially from a longitudinal axis along which the one or more sets of conductive elements are disposed;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements; and the first set of conductive elements of the one or more sets of conductive elements are mounted to a central electrically non-conductive mounting substantially perpendicular the upper electrode and passing through the centre of each conductive element within the first set of conductive elements of the one or more sets of conductive elements.

20. The antenna according to claim 12, further comprising a plurality of sets of electrically non-conductive connectors; wherein a first set of conductive elements of the one or more sets of conductive elements are of a predetermined geometry;

any other set of conductive elements of the one or more sets of conductive elements is a series of annular implementations of the predetermined geometry;

the one or more sets of conductive elements do not overlap radially from a longitudinal axis along which the one or more sets of conductive elements are disposed;

the predetermined geometry exhibits symmetry for a 90° rotation;

each set of electrically non-conductive connectors of the plurality of sets of electrically non-conductive connectors couples an inner conductive plane of the plurality of conductive planes in a set of conductive elements to an outer conductive plane of the plurality of conductive planes in another set of conductive elements;

the first set of conductive elements of the one or more sets of conductive elements are mounted to a central electrically non-conductive mounting substantially perpendicular the upper electrode and passing through the centre of each conductive element within the first set of conductive elements of the one or more sets of conductive elements; and the set of conductive elements of the one or more sets of conductive elements having the outermost annular rings are mounted to a plurality of electrically non-conductive mounting elements disposed at predetermined positions around the periphery of the one or more sets of conductive elements.

\* \* \* \* \*